Patented May 2, 1933

1,906,924

UNITED STATES PATENT OFFICE

HEINRICH BERTSCH, OF CHEMNITZ, GERMANY, ASSIGNOR TO THE FIRM H. TH. BÖHME AKTIENGESELLSCHAFT, OF CHEMNITZ, GERMANY, A CORPORATION OF GERMANY

PRODUCTION OF ALIPHATIC SULPHONIC ACID COMPOUNDS

No Drawing. Application filed March 20, 1930, Serial No. 437,571, and in Germany March 21, 1929.

A number of processes are known, which are based on the familiar idea of preparing products having as high a content of organically combined sulphuric acid as possible by means of as intensive an action of sulphonating agents on oils, fats and the like, as possible and by suitably choosing the reaction conditions. For this purpose the sulphonating agents have been employed in excess or very vigorously acting agents, such as chloro sulphonic acid, have been employed and, if necessary, the action assisted by suitable additions, particularly dehydrating agents, as well as by employing lower temperatures. All these processes, however, do not succeed in producing a uniform product absolutely free from non-sulphonated fractions.

It has also already been proposed to decompose more readily hydrolyzable sulphuric acid esters, after sulphonation, by partial saponification of the acid sulphonate with the aid of water or dilute acid and to separate the regenerated fatty acids from the more stable sulphuric acid esters, which have remained unsaponified. In this case, however, the saponification easily proceeds further than intended and in every case the yield of sulphonated products is considerably reduced thereby.

It has now been found according to this invention that sulphonated oils or fatty acids absolutely free from non-sulphonated constituents may be obtained by mixing and stirring sulphonated oils, after neutralizing the same, with halogen derivatives of hydrocarbons, for example, trichlorethylene, or other suitable inert solvents and allowing the solvent to settle. Two layers are formed, of which the upper layer contains the sulphonated oily product free from non-sulphonated fractions, whilst the lower layer consists of a solution of non-sulphonated oil or fat in trichlorethylene or the like. It has been found that this non-sulphonated fraction consists almost completely of lactones of fatty acids.

In carrying the process into effect it is advantageous to use as starting material oils, which are already highly sulphonated in themselves, such as can be obtained according to the sulphonating methods mentioned above.

*Example*

300 kgms of ricinoleic acid (anhydrous) are mixed with 100 kgms of acetic anhydride and sulphonated at 0° to 5° C. with 450 kgms of concentrated sulphuric acid. The crude sulphonate is allowed to flow with stirring into an ice-cooled solution of Glauber's salt. The mixture is allowed to settle, the salt solution separated and the remainder neutralized whilst cooling with caustic soda solution of 40° Bé. After a few hours Glauber's salt solution is again withdrawn or the mixture filtered from the separated salt. The purified and neutralized sulphonate is treated with 600 litres of water and then thoroughly stirred with 500 kgms of trichlorethylene. The mixture is allowed to settle, the trichlorethylene separated and the sulphonate again thoroughly stirred with 500 kgms of trichlorethylene. After separating the trichlorethylene layer the sulphonate is adjusted to the desired fat content and is ready for use. It is absolutely free from non-sulphonated fractions and shows the valuable properties of the known highly sulphonated oils to an enhanced degree.

The non-sulphonated fat or fatty acid can be recovered, by distilling off the solvent, and separating it from the water by salting out or by evaporating in vacuo.

What I claim is:—

1. The process of preparing neutralized sulphonic acid compounds of fatty acids and their esters comprising, mixing a neutralized sulphonated oil with only water and a halogen derivative of a hydrocarbon of a nature adapted to dissolve an unsulphonated fraction thereof, and allowing said mixture to settle, whereby two layers form, one containing the sulphonated oil and the other the dissolved unsulphonated fraction.

2. The process in accordance with claim 1 wherein the halogen derivative of the hydrocarbon is trichlorethylene.

3. The process in accordance with claim 1 wherein the oil treated is a highly sulphonated oil.

In testimony whereof I hereunto affix my signature this 7th day of March 1930.

HEINRICH BERTSCH.